(12) United States Patent
Mosley (10) Patent No.: US 7,149,071 B2
(45) Date of Patent: Dec. 12, 2006

(54) CONTROLLED RESISTANCE CAPACITORS

(75) Inventor: Larry E. Mosley, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/083,636

(22) Filed: Mar. 17, 2005

(65) Prior Publication Data

US 2006/0209442 A1 Sep. 21, 2006

(51) Int. Cl.
*H01G 4/228* (2006.01)
*H01G 4/005* (2006.01)

(52) U.S. Cl. .................... 361/306.3; 361/303; 361/311
(58) Field of Classification Search ........ 361/303–307, 361/311

See application file for complete search history.

(56) References Cited

U.S. PATENT DOCUMENTS

2005/0047059 A1 * 3/2005 Togashi .................... 361/306.3

* cited by examiner

*Primary Examiner*—Eric W. Thomas
(74) *Attorney, Agent, or Firm*—Blakely, Sokoloff, Taylor & Zafman LLP (57) ABSTRACT

Some embodiments of the present invention include capacitors with controlled resistance.

17 Claims, 8 Drawing Sheets

CONTROLLED RESISTANCE CAPACITORS

TECHNICAL FIELD

Embodiments of the invention relate to capacitor technology. In particular, embodiments of the invention relate to controlling the electrical resistance of capacitors.

BACKGROUND

In capacitor production, power and ground electrodes may be screen printed onto ceramic and interleaved in a stack. The power electrodes may be connected to a power terminal or multiple power terminals and the ground electrodes may be connected to a ground terminal or multiple ground terminals.

Figure 1A:
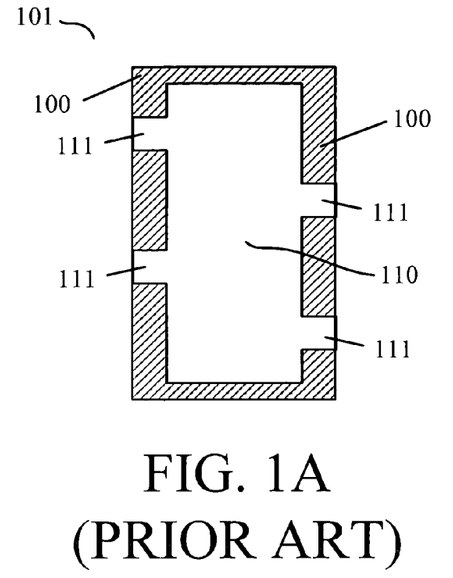
FIGS. 1A–1C illustrate top-down type views of a prior art apparatus.
Figure 1B:
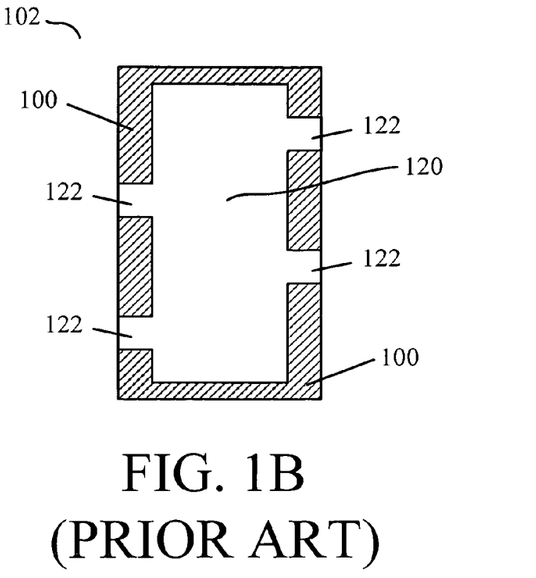
Figure 1C:
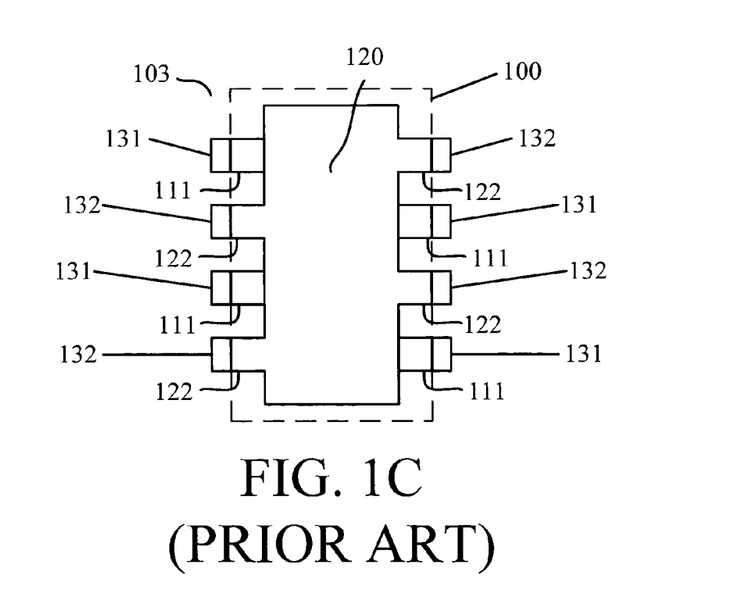

FIGS. 1A–1C illustrate top-down views of a prior art apparatus. FIG. 1A illustrates an electrode layer 101 including an electrode 110 and tabs 111 formed on ceramic 100. FIG. 1B illustrates an electrode layer 102 including electrode 120 and tabs 122 formed on ceramic 100. Several electrode layers 101, 102 (from a few to hundreds) may be alternated and arranged to form a stack 103 as illustrated in FIG. 1C. In FIG. 1C, ceramic 100 is hidden with its outline shown by a dashed line for the purpose of clarity. Tabs 111, 122 may facilitate connection to terminals 131, 132, respectively. Terminals 131, 132 may be positive and negative terminals or power and ground terminals. The terminals may be connected to a circuit such as on a printed circuit board (PCB) or similar electrical system. Stack 103 may illustrate the arrangement of a typical 8 terminal capacitor stack.

The capacitance (C) of the capacitor formed in such a manner may be proportional to the number of electrode layers (N) in the stack, $C=N \times C_{layer}$, where $C_{layer}$ is the capacitance per electrode layer. The electrical resistance (R) of the capacitor may be inversely proportional to the number of electrode layers in the stack, $$R = \frac{R_{layer}}{N},$$

where $R_{layer}$ is the resistance per electrode layer. Therefore, the capacitance and resistance cannot be separately controlled by choosing the number of electrodes in the stack.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION

In various embodiments, an apparatus and method relating to capacitors are described. However, various embodiments may be practiced without one or more of the specific details, or with other methods, materials, or components. In other instances, well-known structures, materials, or operations are not shown or described in detail to avoid obscuring aspects of various embodiments of the invention. Similarly, for purposes of explanation, specific numbers, materials, and configurations are set forth in order to provide a thorough understanding of the invention. Nevertheless, the invention may be practiced without specific details. Furthermore, it is understood that the various embodiments shown in the figures are illustrative representations and are not necessarily drawn to scale.

Capacitor quality may be enhanced by controlling the capacitor's capacitance and electrical resistance. In particular, it may be advantageous to separately control a capacitor's capacitance and electrical resistance.

FIGS. 2A–2E illustrate top-down type views of an apparatus that may provide a controlled resistance capacitor.

Figure 2A:
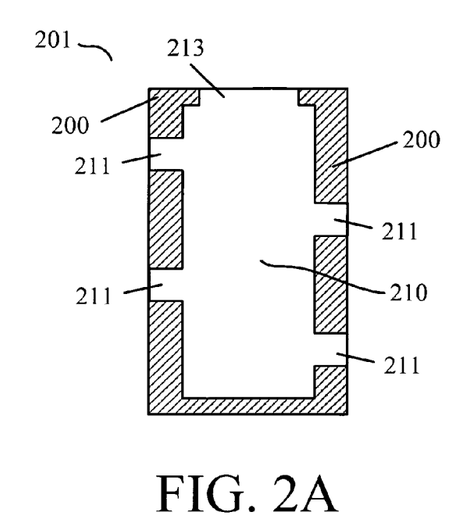
FIGS. 2A–2E illustrate top-down type views of an apparatus in accordance with an embodiment of the present invention.
Figure 2B:
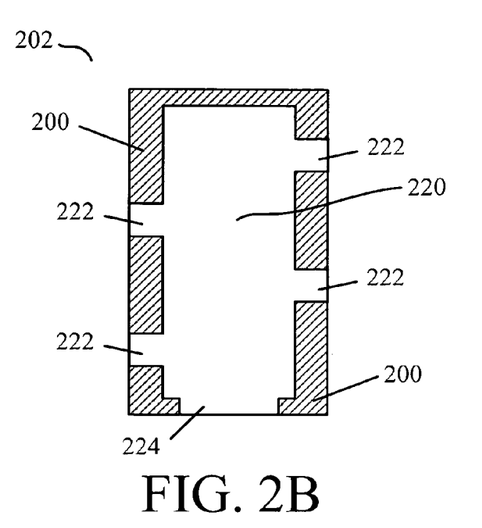

FIG. 2A illustrates an electrode layer 201 including an electrode 210 and tabs 211, 213 formed on dielectric 200. FIG. 2B illustrates an electrode layer 202 including an electrode 220 and tabs 222, 224 formed on dielectric 200. Electrodes 210, 220 and tabs 211, 213, 222, 224 may be any suitable conductive material. In some embodiments, electrodes 210, 220 and tabs 211, 213, 222, 224 may include a metal. Dielectric 200 may include any suitable dielectric material. In an embodiment, dielectric 200 may include a ceramic. Further, although subsequent dielectrics are labeled generally as dielectric 200, it is understood that each electrode or conductive layer may be formed on differing dielectric materials. In general, tabs 211, 213, 222, 224 may also be considered a portion of layers including electrodes 210, 220. Therefore, they may be referred to as either tabs or portions. The tabs or portions may be any size or shape available to facilitate connections between appropriate layers.

Figure 2C:
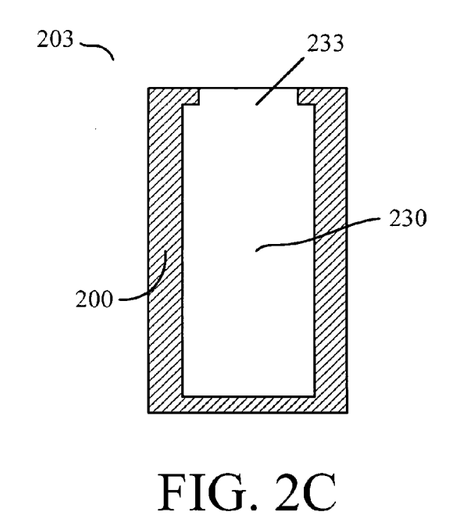
Figure 2D:
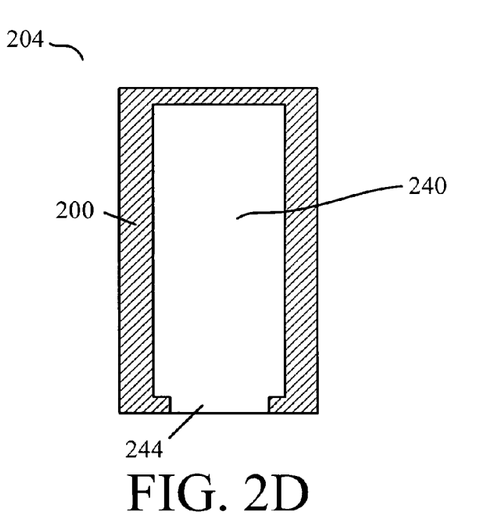

FIG. 2C illustrates a layer 203 including a conductive layer 230 and tab 233 formed on dielectric 200. FIG. 2D illustrates a layer 204 including a conductive layer 240 and a tab 244 formed on dielectric 200. Conductive layers 230, 240 and tabs 233, 244 may be any suitable conductive material. In some embodiments, conductive layers 230, 240 and tabs 233, 244 may include a metal. In general, tabs 233, 244 may also be considered a portion of the layers including conductive layers 330, 340. Therefore, they may be referred to either as tabs or portions.

Figure 2E:
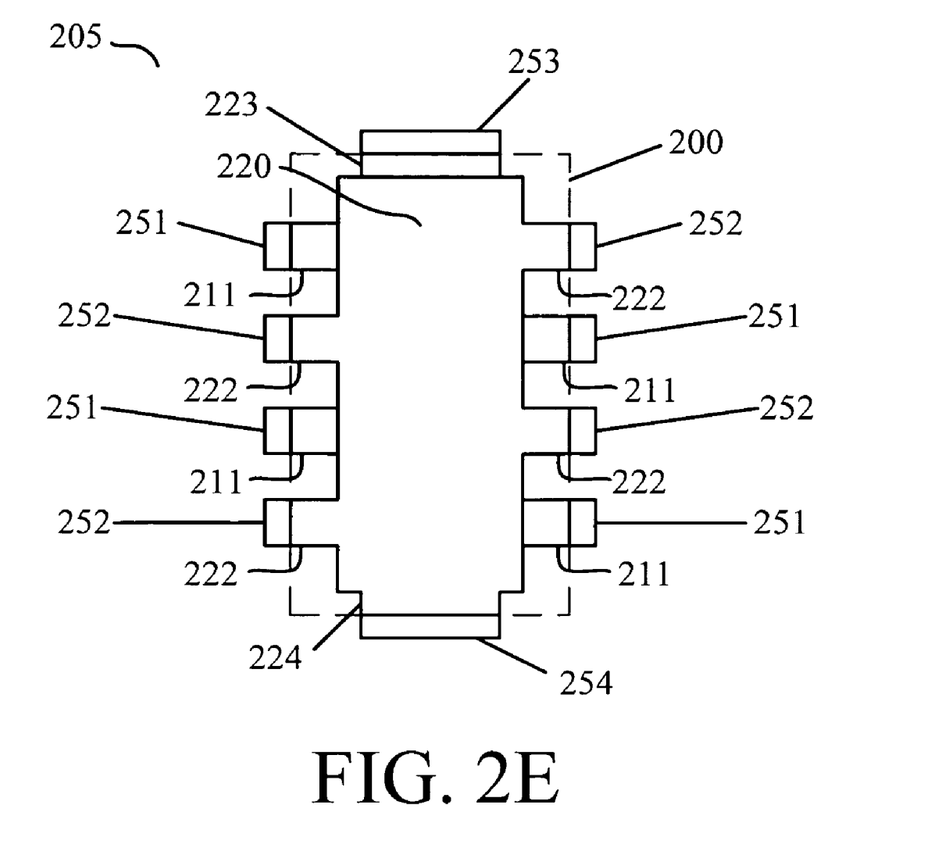

Multiple electrode layers 201, 202 and multiple layers 203, 204 may be arranged in a stack 205, as is illustrated by a top down view in FIG. 2E. In FIG. 2E, dielectric 200 is hidden with its outline shown by a dashed line for the purpose of clarity. FIG. 2E illustrates the top of the stack including electrode layer 202 on top of electrode layer 201, however, other arrangements are available, as is further discussed below.

FIG. 2E also illustrates terminals 251 and terminals 252. Terminals 251, 252 may be any suitable conductive material. Also, although illustrated as the same width as tabs 211, 222, terminals 251, 252 may be of any suitable size. Terminals 251, 252 may be positive and negative terminals or power and ground terminals. The terminals may provide connection to a circuit such as on a printed circuit board (PCB) or similar electrical system.

When layers 201, 202, 203, 204 are arranged into stack 205, tab 233 of layer 203 and tab 213 of electrode layer 201 may facilitate connection of conductive layers 230 to electrodes 210 by a conductive element 253. Also, tab 244 of layer 204 and tab 224 of electrode layer 202 may facilitate connection of conductive layer 240 to electrode 220 by a conductive element 254. In each case, conductive layers 230, 240 and are not directly connected to terminals 251, 252.

By providing conductive layers 230, 240, which are electrically connected to electrodes 210, 220, respectively, but not directly connected to terminals 251, 252, the electrical resistance of the capacitor and the capacitance of the capacitor may be separately controlled. In such a configuration, the capacitance (C) of the capacitor may be controlled by the number of electrode layers 201, 202 ($n$), the capacitance of electrode layers 201, 202 ($C_n$), the number of conductive layers 203, 204 ($m$), and the capacitance of conductive layers 203, 204 ($C_m$) where $C = n \times C_n + m \times C_m$. The electrical resistance (R) of the capacitor may be controlled independently by choosing the number of conductive layers 203, 204 ($m$) relative to the number of electrode layers 201, 202 ($n$) where the larger the ratio of $$\frac{m}{n},$$

the larger the resistance of the capacitor.

In stack 205, conductive layers 203, 204 and electrode layers 201, 202 may be stacked in a variety of ways. For the sake of brevity, in describing the layer ordering, the following nomenclature is used: conductive layers 203 (1C), conductive layers 204 (2C), electrode layers 201 (1E), and electrode layers 202 (2E). In an embodiment, the layers may be arranged according to the pattern 1E, 2E, 1E, 2E, . . . 1E, 2E, 1C, 2C, 1C, 2C . . . 1C, 2C, 1E, 2E, 1E, 2E, . . . 1E, 2E, 1E, 2E. In another embodiment, the layers may be arranged according to the pattern 1E, 2E, 1E, 2E, . . . 1E, 2E, 1C, 2C, 1C, 2C . . . 1C, 2C. In another embodiment, the layers may be arranged according to the pattern 1E, 2E, 1C, 2C, 1E, 2E, 1C, 2C, . . . 1E, 2E, 1C, 2C, 1E, 2E, 1C, 2C. Other arrangements may be available.

Any number of electrode layers 201, 202 and layers 203, 204 may be used. In an embodiment, one each of electrode layers 201, 202 and layers 203, 204 may be used. In an embodiment a few electrode layers 201, 202 and a few layers 203, 204 may be used. In another embodiment, hundreds of electrode layers 201, 202 and a few layers 203, 204 may be used. In an embodiment, hundreds of electrode layers 201, 202 and hundreds of layers 203, 204 may be used. In another embodiment, a few electrode layers 201, 202 and hundreds of layers 203, 204 may be used.

FIGS. 3A–3E illustrate top-down type views of another embodiment that may provide a controlled resistance capacitor. In addition, the apparatus of FIGS. 3A–3E may provide reduced inductance relative to the apparatus of FIGS. 2A–2E due to smaller, alternating tabs connecting electrodes and conductive layers, as is further described below.

Figure 3A:
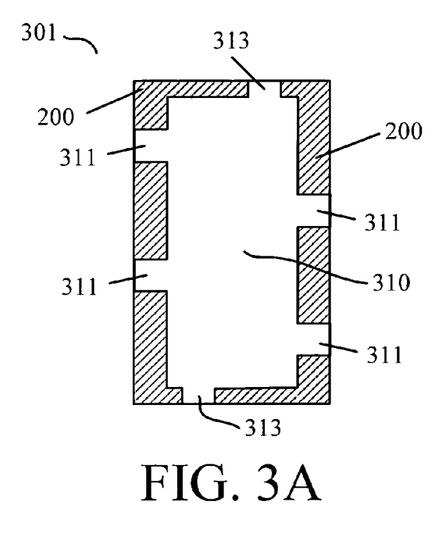
FIGS. 3A–3E illustrate top-down type views of an apparatus in accordance with an embodiment of the present invention.
Figure 3B:
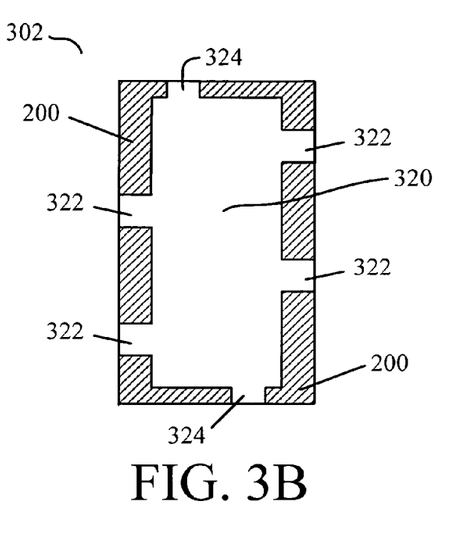

FIG. 3A illustrates an electrode layer 301 including an electrode 310 and tabs 311, 313 formed on dielectric 200. FIG. 3B illustrates an electrode layer 302 including an electrode 320 and tabs 322, 324 formed on dielectric 200. Electrodes 310, 320 and tabs 311, 313, 322, 324 may be any suitable conductive material. In some embodiments, electrodes 310, 320 and tabs 311, 313, 322, 324 may include a metal. In general, tabs 311, 313, 322, 324 may also be considered a portion of layers including electrodes 310, 320. Therefore, they may be referred to as either tabs or portions.

Figure 3C:
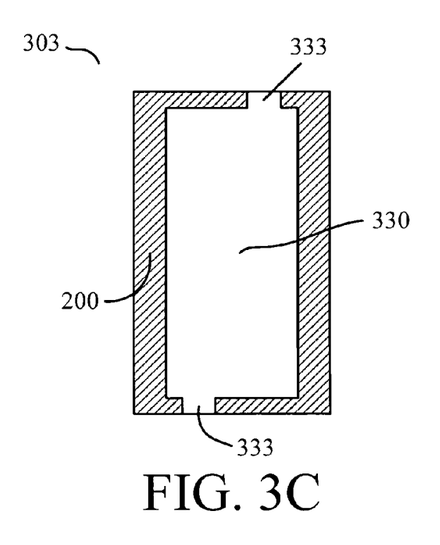
Figure 3D:
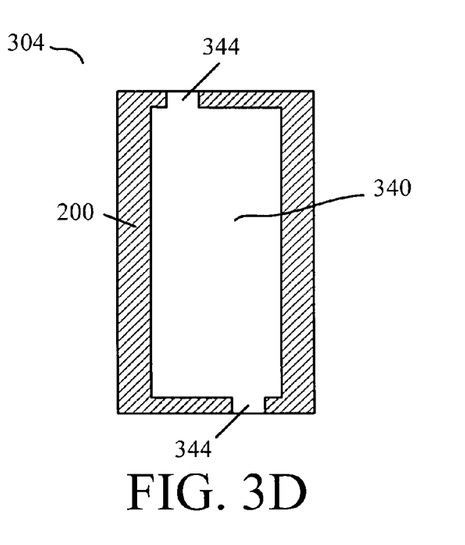

FIG. 3C illustrates a layer 303 including a conductive layer 330 and tabs 333 formed on dielectric 200. FIG. 3D illustrates a layer 304 including a conductive layer 340 and a tabs 344 formed on dielectric 200. Conductive layers 330, 340 and tabs 333, 344 may be any suitable conductive material. In some embodiments, conductive layers 330, 340 and tabs 333, 344 may include a metal. In general, tabs 333, 344 may also be considered a portion of the layers including conductive layers 330, 340. Therefore, they may be referred to either as tabs or portions.

Figure 3E:
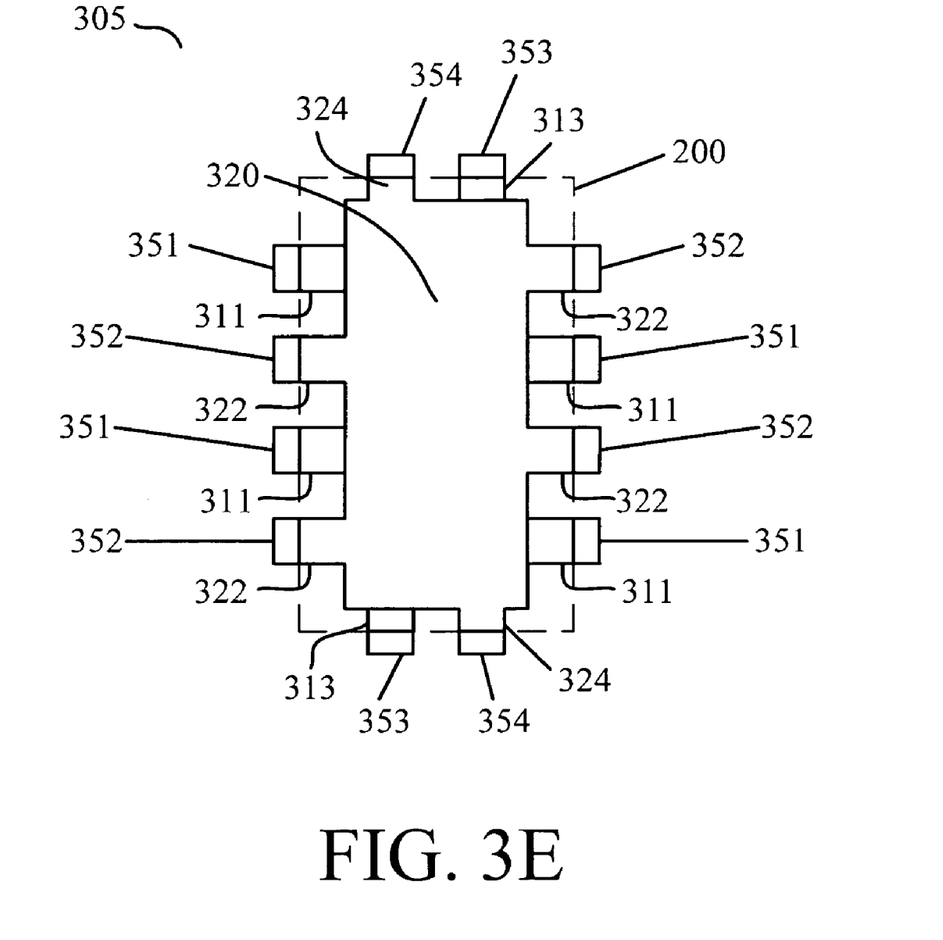

Multiple electrode layers 301, 302 and multiple layers 303, 304 may be arranged in a stack 305, as is illustrated by a top down view in FIG. 3E. In FIG. 3E, dielectric 200 is hidden with its outline shown by a dashed line for the purpose of clarity. FIG. 3E illustrates the top of the stack including electrode layer 302 on top of electrode layer 301, however, other arrangements are available, as is further discussed below.

FIG. 3E also illustrates terminals 351 and terminals 352. Terminals 351, 352 may be any suitable conductive material. Also, although illustrated as the same width as tabs 311, 322, terminals 351, 352 may be of any suitable size. Terminals 351, 352 may be positive and negative terminals or power and ground terminals. The terminals may provide connection to a circuit such as on a printed circuit board (PCB) or similar electrical system.

When layers 301, 302, 303, 304 are arranged into stack 305, tabs 333 of layer 303 and tabs 313 of electrode layer 301 may facilitate connection of conductive layers 330 to electrodes 310 by conductive elements 353. Also, tabs 344 of layer 304 and tabs 324 of electrode layer 302 may facilitate connection of conductive layers 340 to electrodes 320 by conductive elements 354. In each case, conductive layers 330, 340 and are not directly connected to terminals 351, 352.

As discussed above, in such a configuration, the capacitance (C) of the capacitor may be controlled by the number of electrode layers 301, 302 ($n$), the capacitance of electrode layers 301, 302 ($C_n$), the number of conductive layers 303, 304 ($m$), and the capacitance of conductive layers 303, 304 ($C_m$) where $C = n \times C_n + m \times C_m$. The electrical resistance (R) of the capacitor may be controlled independently by choosing the number of conductive layers 303, 304 ($m$) relative to the number of electrode layers 301, 302 ($n$) where the larger the ratio of $$\frac{m}{n},$$

the larger the resistance of the capacitor.

In the configuration illustrated in FIG. 3E, the inductance of stack 305 may be improved relative to stack 205 due to the increase in the number of tabs 313, 324, 333, 344 available to facilitate connection of layers 303, 304 to electrode layers 301, 302. From stack 205 to stack 305, the number of tabs available for each increases from 1 to 2. Further, as illustrated in FIG. 3E, the tabs are alternated around the perimeter of stack 305 such that tabs 311 and tabs 313 alternate with tabs 322 and tabs 324. In general, increasing the number of tabs and alternating them may reduce the inductance of a stack.

In stack 305, conductive layers 303, 304 and electrode layers 301, 302 may be stacked in a variety of ways. Using the same nomenclature as above, in an embodiment, the layers may be arranged according to the pattern 1E, 2E, 1E, 2E, ... 1E, 2E, 1C, 2C, 1C, 2C ... 1C, 2C, 1E, 2E, 1E, 2E, ... 1E, 2E, 1E, 2E. In another embodiment, the layers may be arranged according to the pattern 1E, 2E, 1E, 2E, ... 1E, 2E, 1C, 2C, 1C, 2C ... 1C, 2C. In another embodiment, the layers may be arranged according to the pattern 1E, 2E, 1C, 2C, 1E, 2E, 1C, 2C, ... 1E, 2E, 1C, 2C, 1E, 2E, 1C, 2C. Other arrangements may be available.

Any number of electrode layers 301, 302 and layers 303, 304 may be used. In an embodiment, one each of electrode layers 301, 302 and layers 303, 304 may be used. In an embodiment a few electrode layers 301, 302 and a few layers 303, 304 may be used. In another embodiment, hundreds of electrode layers 301, 302 and a few layers 303, 304 may be used. In an embodiment, hundreds of electrode layers 301, 302 and hundreds of layers 303, 304 may be used. In another embodiment, a few electrode layers 301, 302 and hundreds of layers 303, 304 may be used.

FIGS. 4A–4E illustrate top-down type views of an apparatus that may provide a controlled resistance capacitor.

Figure 4A:
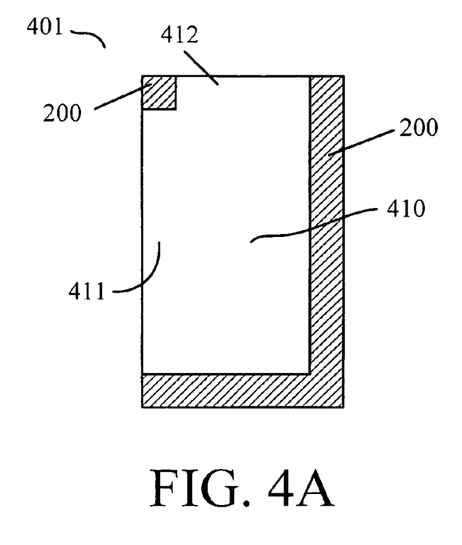
FIGS. 4A–4E illustrate top-down type views of an apparatus in accordance with an embodiment of the present invention.
Figure 4B:
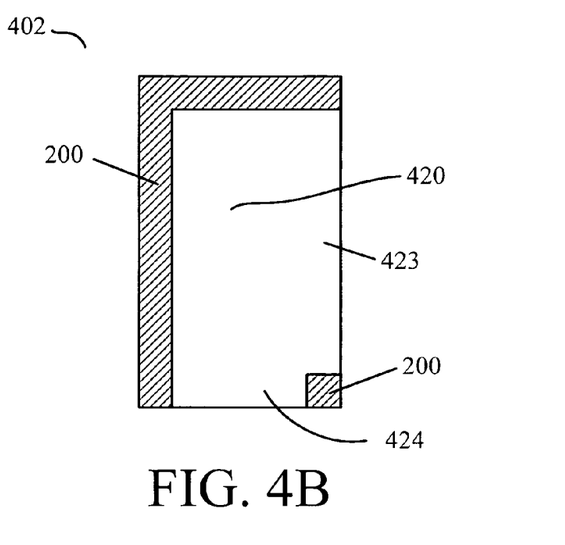

FIG. 4A illustrates an electrode layer 401 including an electrode 410 and tabs 411, 412 formed on dielectric 200. FIG. 4B illustrates an electrode layer 402 including an electrode 420 and tabs 423, 424 formed on dielectric 200. Electrodes 410, 420 and tabs 411, 412, 423, 424 may be any suitable conductive material. In some embodiments, electrodes 410, 420 and tabs 411, 412, 423, 424 may include a metal. In general, tabs 411, 412, 423, 424 may also be considered a portion of layers including electrodes 410, 420. Therefore, they may be referred to as either tabs or portions.

Figure 4C:
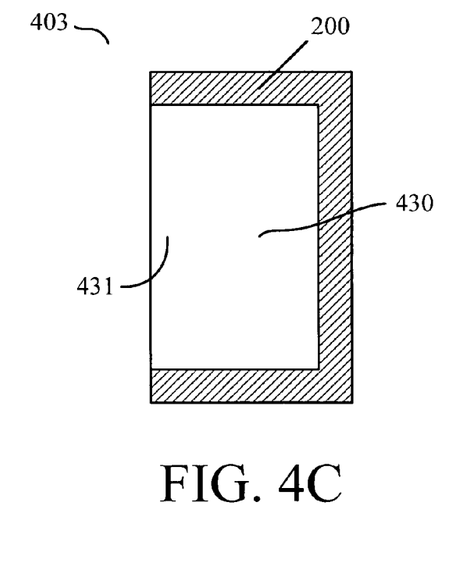
Figure 4D:
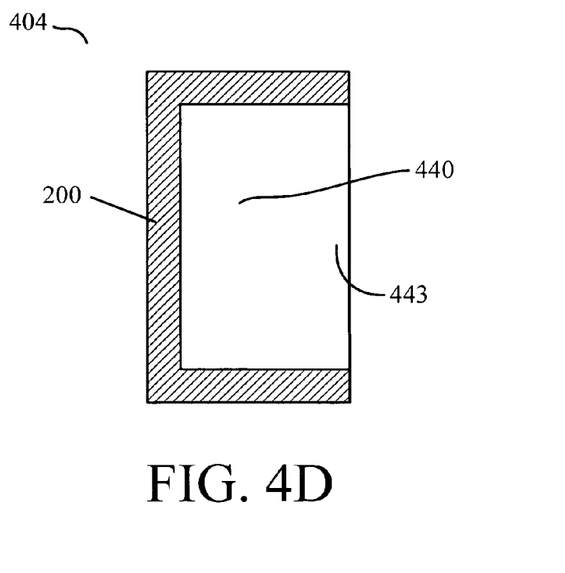

FIG. 4C illustrates a layer 403 including a conductive layer 430 and tab 431 formed on dielectric 200. FIG. 3D illustrates a layer 404 including a conductive layer 440 and a tab 443 formed on dielectric 200. Conductive layers 430, 440 and tabs 431, 443 may be any suitable conductive material. In some embodiments, conductive layers 430, 440 and tabs 431, 443 may include a metal. In general, tabs 431, 443 may also be considered a portion of the layers including conductive layers 430, 440. Therefore, they may be referred to either as tabs or portions.

Figure 4E:
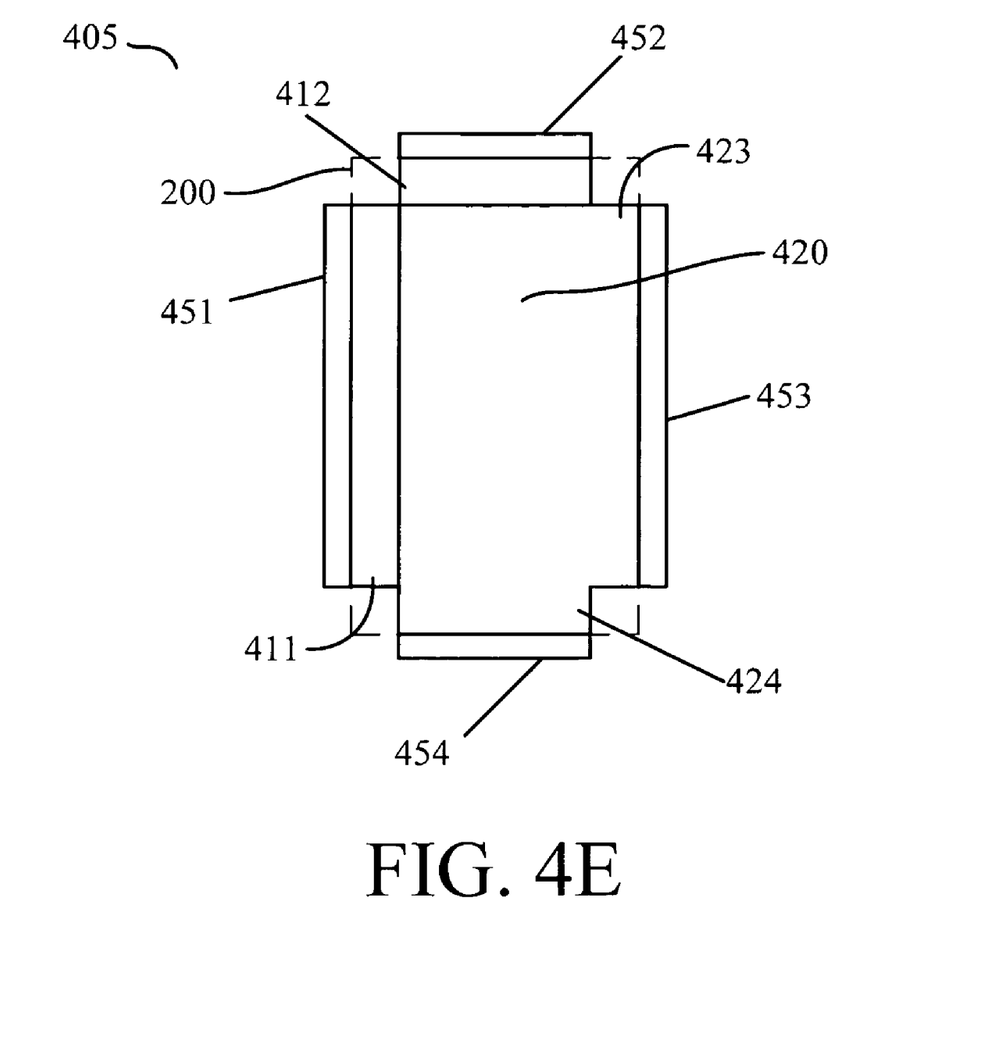

Multiple electrode layers 401, 402 and multiple layers 403, 404 may be arranged in a stack 405, as is illustrated by a top down view in FIG. 4E. In FIG. 4E, dielectric 200 is hidden with its outline shown by a dashed line for the purpose of clarity. FIG. 4E illustrates the top of the stack including electrode layer 402 on top of electrode layer 401, however, other arrangements are available, as is further discussed below.

FIG. 4E also illustrates terminal 452 and terminal 454. Terminals 452, 454 may be any suitable conductive material. Also, although illustrated as the same width as tabs 412, 454, terminals 452, 454 may be of any suitable size. Terminals 452, 454 may be positive and negative terminals or power and ground terminals. The terminals may provide connection to a circuit on a printed circuit board (PCB) or similar electrical system.

When layers 401, 402, 403, 404 are arranged into stack 405, tab 431 of layer 403 and tab 411 of electrode layer 401 may facilitate connection of conductive layers 30 to electrodes 410 by conductive elements 451. Also, tab 443 of layer 404 and tab 423 of electrode layer 402 may facilitate connection of conductive layers 440 to electrodes 420 by conductive elements 354. In each case, conductive layers 430, 440 and are not directly connected to terminals 452, 454.

As discussed above, in such a configuration, the capacitance (C) of the capacitor may be controlled by the number of electrode layers 401, 402 ($n$), the capacitance of electrode layers 401, 402 ($C_n$), the number of conductive layers 403, 404 ($m$), and the capacitance of conductive layers 403, 404 ($C_m$) where $C = n \times C_n + m \times C_m$. The electrical resistance (R) of the capacitor may be controlled independently by choosing the number of conductive layers 403, 404 ($m$) relative to the number of electrode layers 401, 402 ($n$) where the larger the ratio of $$\frac{m}{n},$$

the larger the resistance of the capacitor.

In stack 405, conductive layers 403, 404 and electrode layers 401, 402 may be stacked in a variety of ways. Using the same nomenclature as above, in an embodiment, the layers may be arranged according to the pattern 1E, 2E, 1E, 2E, ... 1E, 2E, 1C, 2C, 1C, 2C ... 1C, 2C, 1E, 2E, 1E, 2E, ... 1E, 2E, 1E, 2E. In another embodiment, the layers may be arranged according to the pattern 1E, 2E, 1E, 2E, ... 1E, 2E, 1C, 2C, 1C, 2C ... 1C, 2C. In another embodiment, the layers may be arranged according to the pattern 1E, 2E, 1C, 2C, 1E, 2E, 1C, 2C, ... 1E, 2E, 1C, 2C, 1E, 2E, 1C, 2C. Other arrangements may be available.

Any number of electrode layers 401, 402 and layers 403, 404 may be used. In an embodiment, one each of electrode layers 401, 402 and layers 403, 404 may be used. In an embodiment a few electrode layers 401, 402 and a few layers 403, 404 may be used. In another embodiment, hundreds of electrode layers 401, 402 and a few layers 403, 404 may be used. In an embodiment, hundreds of electrode layers 401, 402 and hundreds of layers 403, 404 may be used. In another embodiment, a few electrode layers 401, 402 and hundreds of layers 403, 404 may be used.

Although embodiments are illustrated using typical 8 and 2 terminal configurations, those examples are not meant to be limiting. In other embodiments, 4 terminal or 10 terminal configurations may be available. In other embodiments, any number of terminals may be available. Other shapes and orientations of the above stacks may also be available. In an embodiment, the stack may be in a reverse geometry 2 terminal layout. In another embodiment, the stack may be square. In other embodiments, a variety of shapes may be available. Further, although connections between conductive layers and electrodes are shown typically by conductive elements, other options may be available. In an embodiment, connections may be made by vias.

In some embodiments, the above described apparatuses may provide decoupling, filtering, oscillation damping, and other benefits in electrical circuits.

Figure 5:
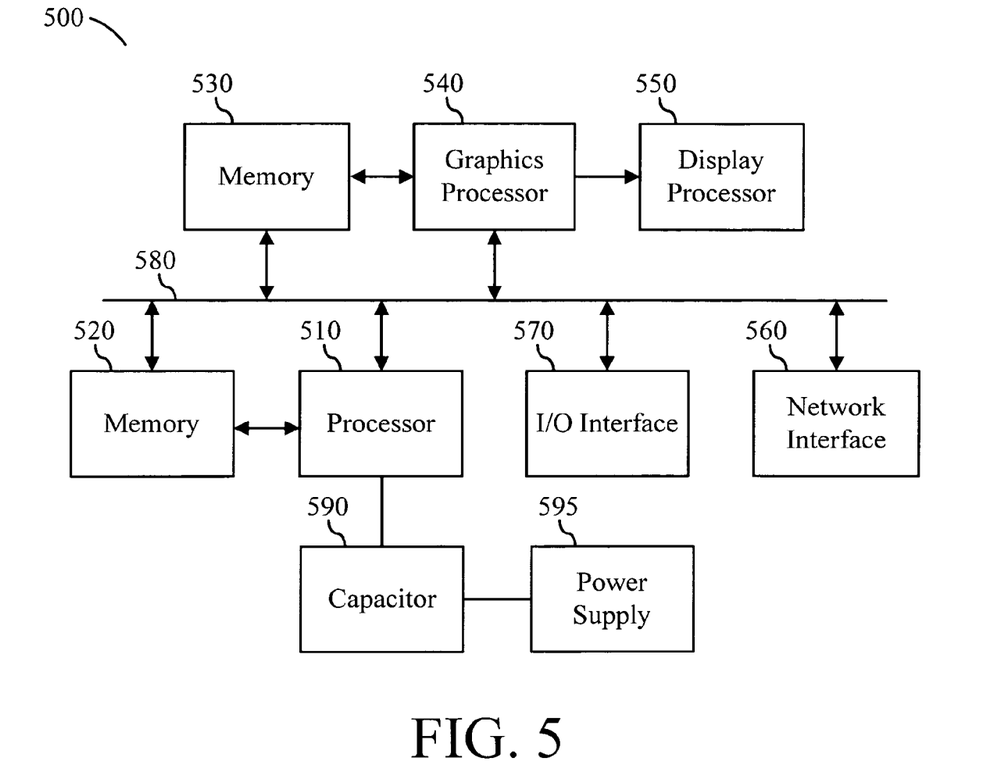
FIG. 5 illustrates a schematic of a system in accordance with an embodiment of the present invention.

As illustrated in FIG. 5, a capacitor 590 may be incorporated into a system 500. System 500 may include a processor 510, a memory 520, a memory 530, a graphics processor 540, a display processor 550, a network interface 560, an I/O interface 570, a communication bus 580, and a power supply 595. In an embodiment, capacitor 590 may be connected between power supply 595 and processor 540.

Reference throughout this specification to "one embodiment" or "an embodiment" means that a particular feature, structure, material, or characteristic described in connection with the embodiment is included in at least one embodiment of the invention. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner in one or more embodiments.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A capacitor comprising:
   a stack of layers including:
      a first electrode, the first electrode having six tabs, tabs 1T, 2T, 3T, 4T, 5T, and 6T;
      a second electrode, the second electrode having six tabs, tabs 7T, 8T, 9T, 10T, 11T, and 12T;
      a first conductive layer; and
      a second conductive layer, wherein each layer is separated by dielectric material;
   a first, a second, a third, and a fourth terminal connected to the first electrode at tabs 1T, 2T, 3T, and 4T;
   a fifth, a sixth, a seventh, and an eighth terminal connected to the second electrode at tabs 7T, 8T, 9T, and 10T;
   a first conductive element connecting the first electrode and the first conductive layer; and
   a second conductive element connecting the second electrode and the second conductive layer, wherein the first and second conductive layers are separated from the terminals by dielectric material, and wherein the tabs are arranged around the perimeter of the stack in the order of 1T, 7T, 2T, 8T, 6T, 12T, 3T, 9T, 4T, 10T, 5T, 11T.

2. The capacitor of claim 1, wherein the first conductive layer comprises a tab to facilitate connection to first electrode.

3. The capacitor of claim 1, wherein the first conductive layer comprises at least two tabs to facilitate connection to the first electrode.

4. The capacitor of claim 1, wherein the dielectric material includes a ceramic.

5. The capacitor of claim 1, wherein the dielectric material comprises at least two different materials.

6. The capacitor of claim 1, further comprising:
   a plurality of first electrodes, a plurality of second electrodes, a plurality of first conductive layers, and a plurality of second conductive layers in the stack, wherein the first terminal is connected to the first plurality of electrodes, the second terminal is connected to the second plurality of electrodes, the first conductive element is connected to the plurality of first of electrodes and the plurality of first conductive layers, and the second conductive element is connected to the plurality of second electrodes and the plurality of second conductive layers.

7. The capacitor of claim 6, wherein the first electrodes (1E), second electrodes (2E), first conductive layers (1C), and second conductive layers (2C) are in a stack according to a pattern comprising 1E, 2E, 1E, 2E, . . . 1E, 2E, 1C, 2C, 1C, 2C . . . 1C, 2C, 1E, 2E, 1E, 2E, . . . 1E, 2E, 1E, 2E.

8. The capacitor of claim 6, wherein the first electrodes (1E), second electrodes (2E), first conductive layers (1C), and second conductive layers (2C) are in a stack according to a pattern comprising 1E, 2E, 1E, 2E, . . . 1E, 2E, 1C, 2C, 1C, 2C . . . 1C, 2C.

9. The capacitor of claim 6, wherein the first electrodes (1E), second electrodes (2E), first conductive layers (1C), and second conductive layers (2C) are in a stack according to a pattern comprising 1E, 2E, 1C, 2C, 1E, 2E, 1C, 2C, . . . 1E, 2E, 1C, 2C, 1E, 2E, 1C, 2C.

10. A system comprising:
    a microprocessor connected to a capacitor including:
       a stack of layers including:
          a first electrode, the first electrode having six tabs, tabs 1T, 2T, 3T, 4T, 5T, and 6T;
          a second electrode, the second electrode having six tabs, tabs 7T, 8T, 9T, 10T, 11T, and 12T;
          a first conductive layer; and
          a second conductive layer, wherein each layer is separated by dielectric material;
       a first, a second, a third, and a fourth terminal connected to the first electrode at tabs 1T, 2T, 3T, and 4T;
       a fifth, a sixth, a seventh, and an eighth terminal connected to the second electrode at tabs 7T, 8T, 9T, and 10T;
       a first conductive element connecting the first electrode and the first conductive layer; and
       a second conductive element connecting the second electrode and the second conductive layer, wherein the first and second conductive layers are separated from the terminals by dielectric material, and wherein the tabs are arranged around the perimeter of the stack in the order of 1T, 7T, 2T, 8T, 6T, 12T, 3T, 9T, 4T, 10T, 5T, 11T; and
    a display processor.

11. The system of claim 10, further comprising:
    a volatile memory component.

12. A capacitor comprising:
    a stack of layers including:
       a first electrode, the first electrode having six tabs, tabs 1T, 2T, 3T, 4T, and 5T;
       a second electrode, the second electrode having six tabs, tabs 6T, 7T, 8T, 9T, and 10T;
       a first conductive layer; and
       a second conductive layer, wherein each layer is separated by dielectric material;
    a first, a second, a third, and a fourth terminal connected to the first electrode at tabs 1T, 2T, 3T, and 4T;
    a fifth, a sixth, a seventh, and an eighth terminal connected to the second electrode at tabs 6T, 7T, 8T, and 9T;
    a first conductive element connecting the first electrode and the first conductive layer; and
    a second conductive element connecting the second electrode and the second conductive layer, wherein the first and second conductive layers are separated from the terminals by dielectric material, and wherein the tabs are arranged around the perimeter of the stack in the order of 1T, 6T, 2T, 7T, 5T, 3T, 8T, 4T, 10T.

13. The capacitor of claim 12, wherein the first conductive layer comprises a tab to facilitate connection to first electrode.

14. The capacitor of claim 12, further comprising:
    a plurality of first electrodes, a plurality of second electrodes, a plurality of first conductive layers, and a plurality of second conductive layers in the stack, wherein the first terminal is connected to the first plurality of electrodes, the second terminal is connected to the second plurality of electrodes, the first conductive element is connected to the plurality of first of electrodes and the plurality of first conductive layers, and the second conductive element is connected to the plurality of second electrodes and the plurality of second conductive layers.

15. The capacitor of claim 14, wherein the first electrodes (1E), second electrodes (2E), first conductive layers (1C), and second conductive layers (2C) are in a stack according to a pattern comprising 1E, 2E, 1E, 2E, . . . 1E, 2E, 1C, 2C, 1C, 2C . . . 1C, 2C, 1E, 2E, 1E, 2E, . . . 1E, 2E, 1E, 2E.

16. The capacitor of claim 14, wherein the first electrodes (1E), second electrodes (2E), first conductive layers (1C), and second conductive layers (2C) are in a stack according to a pattern comprising 1E, 2E, 1E, 2E, . . . 1E, 2E, 1C, 2C, 1C, 2C . . . 1C, 2C.

17. The capacitor of claim 14, wherein the first electrodes (1E), second electrodes (2E), first conductive layers (1C), and second conductive layers (2C) are in a stack according to a pattern comprising 1E, 2E, 1C, 2C, 1E, 2E, 1C, 2C, . . . 1E, 2E, 1C, 2C, 1E, 2E, 1C, 2C.

\* \* \* \* \*